March 25, 1924.
K. G. YONCE
NOZZLE FOR PLANT SPRAYERS
Filed Aug. 17, 1922
1,488,084
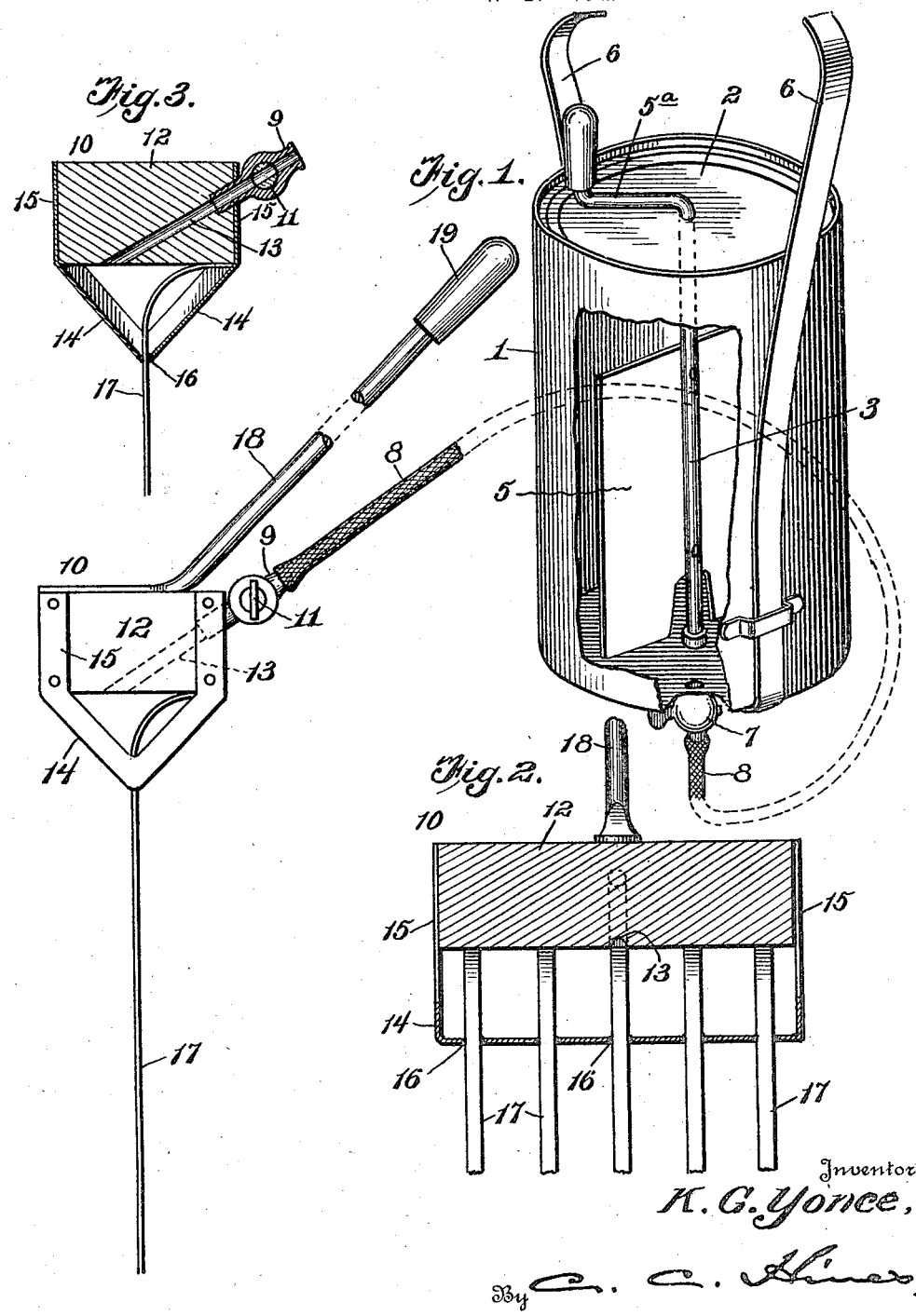
Inventor:
K. G. Yonce,
By C. C. Hines,
Attorney.

Patented Mar. 25, 1924.

1,488,084

UNITED STATES PATENT OFFICE.

KELLEY G. YONCE, OF RIDGE SPRING, SOUTH CAROLINA.

NOZZLE FOR PLANT SPRAYERS.

Application filed August 17, 1922. Serial No. 582,463.

*To all whom it may concern:*

Be it known that I, KELLEY G. YONCE, a citizen of the United States, residing at Ridge Spring, in the county of Saluda and State of South Carolina, have invented new and useful Improvements in Nozzles for Plant Sprayers, of which the following is a specification.

This invention relates to improvements in plant sprayers, for use in spraying cotton or other growing plants with an insecticide fluid or solution, as is necessary at times to effect the destruction of insects preying upon the growing vegetation, and particularly to improvements in discharge nozzles for such sprayers.

The object of the invention is to provide a novel construction of dirigible spray nozzle which may be supplied with the insecticide fluid or solution from a reservoir through a flexible tube or pipe, allowing the nozzle to be manipulated as desired, said nozzle being provided with simple and efficient means of an improved character for agitating and separating the foliage of the plants for the thorough distribution of the fluid or solution thereto without waste.

The invention consists of the features of construction, combination and arrangement of parts, hereinafter fully described and claimed, reference being had to the accompanying drawing, in which:—

Figure 1 is a perspective view of the complete device with parts broken away.

Figure 2 is a vertical longitudinal section through the spray nozzle.

Figure 3 is a vertical transverse section through the nozzle.

In carrying my invention into practice I provide a reservoir 1 to contain the insecticide fluid or solution to be distributed, said reservoir preferably comprising a cylindrical metal can having a fixed bottom and provided at its top with a filling opening normally closed by a removable lid or cover 2. A shaft 3 extends downwardly into the receptacle through the lid or cover 2 and is journaled at its upper end in said lid or cover and at its lower end in a bearing member 4 secured to the bottom head of the receptacle. This shaft carries a rotary agitator blade 5 and the outer upper end of the shaft is provided with a crank handle 5ª whereby the shaft may be rotated or oscillated from time to time to keep the contents of the reservoir, if a solution, in properly intermixed condition for use. The agitator, constructed as described, is removable with the lid or cover 2 as a unit and fits loosely at its lower end in the bearing 4 in order to permit it to be applied and removed. A suspending strap 6 is suitably applied to the reservoir so that the device may be suspended from the shoulder of the wearer for transportation along the rows of growing plants in a field which are to be sprayed.

The reservoir 1 is provided at its bottom with a valved discharge outlet 7 having a fitting to receive one end of a flexible discharge pipe or tube 8, connected at its opposite end to the inlet nipple 9 of a spray nozzle 10, said nipple 9 being provided with a controlling and cut-off valve 11. In the use of the device the valve of outlet 7 may be employed to cut off the discharge of fluid or solution when the device is not in use, and said valve may be fully opened when the device is in use, the valve 11 being employed to regulate the supply of the fluid or solution to the nozzle according to the volume or quantity to be dispensed.

The nozzle 10 comprises a block or head 12, preferably of oblong rectangular form, to which the nipple 9 is secured, said block or head having a feed passage 13 extending from the nipple downwardly and forwardly at an angle and opening through the bottom face thereof. Disposed below the head 12 is a discharge trough 14 formed of sheet metal, said trough being substantially V-shaped in cross-section and having upwardly extending arms 15 which are suitably secured to the head block. The nozzle is of a depth to hold a predetermined amount of the fluid or solution, and is provided in its apex portion with a longitudinal row or series of discharge outlets 16. Fixed at their upper ends to the block, or suitably clamped between the block and a portion of the trough, is a series of flexible agitator strips and distributors 17, the upper ends of said strips extending under the bottom face of the head blocks 12 and said strips thence extending outwardly through the discharge openings 16, one of such strips extending through each of said discharge openings. The projecting portions of the strips are free from connection with each other and are of sufficient length to serve effectually as plant foliage agitators and fluid agitators or distributors, their length varying according to conditions of service or the character of the plants to be treated. Affixed at one end to the nozzle head 12 is a rod or arm 18 provided at its free end with a suitable grip or handle 19 whereby the nozzle may be carried and manipulated.

In the use of the device, the reservoir 1 is charged with a desired amount of the fluid or solution and suspended by the straps upon one of the shoulders of the operator, the reservoir being held in such position that one hand of the operator may be employed to operate the crank handle 5ª in a convenient manner at proper intervals and as occasion may require. The other hand of the operator is engaged with the nozzle handle 19 and employed to support the nozzle and manipulate it in its distributing action. The operator carrying the device in the manner described walks along a row of growing plants and, the valves being suitably opened for the discharge of the fluid, moves the nozzle back and forth over the plants in such manner as to open up their foliage and to cause the insecticide fluid or solution to be discharged over all portions of the plants and with particular thoroughness over any portion of a plant which may appear to be infested with insects. It will be understood that the form of the nozzle head and trough adapts the same to be inserted between the foliage elements of the plants, and by their rigidity will enable rigid portions of the foliage to be opened up or separated while the flexible strips 17 will enter between the parts of the foliage and separate or spread all tender or flexible portions thereof, thereby enabling all portions of the plants to be reached and lightly sprinkled or drenched as desired with the fluid or solution. It will be understood that the fluid or solution passes from the opening 13 down into the trough and also flows along the inside of the head 12 and thence trickles down the upper ends of the strips 17 to the bottom of the trough, and a certain quantity of the solution will be retained in the trough and its discharge through the openings 16 regulated by the portions of the flexible strips 17 extending therethrough, which in the movements of said strips operate as valves controlling the flow of the fluid or solution through said openings. The fluid therefore discharges through the openings in the form of jets or sprays, and also flows by gravity along the flexible strips 17 and, by the wiping of said strips over the surfaces of the plants, will be dissipated by a sprinkling action, whereby all portions of the plant will be penetrated. The strips 17 therefore serve not only as dividers to separate the portions of the plant, but as conductors to convey the insecticide thereto and spray the same thereon, and they furthermore serve, in wiping across the surfaces of the plant to dislodge many insects and cause them to fall to the ground, so that they may be easily destroyed.

From the foregoing description, taken in connection with the drawing, the construction and mode of use of my improved nozzles for sprayers or insecticide distributors will be readily understood, and it will be seen that the invention provides a device of this character, particularly adapted for the use of gardeners, small farmers and fruit growers, whereby growing plants may be quickly and efficiently treated with an insecticide fluid or solution in a ready, convenient and labor-saving manner; also that the simplicity of the device adapts it to be manufactured and sold at a comparatively low cost, thereby enabling it to be sold at a price within the reach of those unable to purchase spraying equipment of a complex construction.

Having thus fully described my invention, I claim:

1. A discharge nozzle for insecticide sprayers and the like comprising a head block having a liquid inlet and a discharge passage leading from said inlet to the underside of said block, a trough secured to the block and disposed beneath the bottom face thereof and having discharge outlets in the bottom thereof, flexible discharge strips arranged at one end beneath the bottom of the block and extending into the trough and outwardly through the discharge outlets thereof, and a handle for manipulating said nozzle.

2. A discharge nozzle for insecticide sprayers and the like comprising a head block of oblong rectangular form having at its rear side an inlet connected with said pipe, and provided with a feed passage leading from said inlet downwardly through the bottom face of said block, a trough disposed beneath the bottom of the block, said trough being substantially V-shaped in cross-section and having in the apex portion thereof a series of discharge openings, flexible strips having their inner ends arranged within the trough and beneath the bottom of the block, and said strips extending outwardly through the discharge openings in the trough, and a manipulating handle connected with the head block.

In testimony whereof I affix my signature.

KELLEY G. YONCE.